US010678451B2

(12) United States Patent
Baptist et al.

(10) Patent No.: US 10,678,451 B2
(45) **Date of Patent: *Jun. 9, 2020**

(54) CYCLING OUT DISPERSED STORAGE PROCESSING UNITS FROM ACCESS POOLS TO PERFORM EXPENSIVE OPERATIONS

(71) Applicant: International Business Machines Corporation, Armonk, NY (US)

(72) Inventors: Andrew D. Baptist, Mt. Pleasant, WI (US); Ravi V. Khadiwala, Bartlett, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/175,535

(22) Filed: Oct. 30, 2018

(65) Prior Publication Data

US 2019/0065119 A1 Feb. 28, 2019

Related U.S. Application Data

(63) Continuation of application No. 15/467,121, filed on Mar. 23, 2017, now Pat. No. 10,140,061.
(Continued)

(51) Int. Cl.
*G06F 9/48* (2006.01)
*G06F 3/06* (2006.01)
(Continued)

(52) U.S. Cl.
CPC ............ *G06F 3/0619* (2013.01); *G06F 3/061* (2013.01); *G06F 3/0604* (2013.01); *G06F 3/064* (2013.01); *G06F 3/067* (2013.01); *G06F 3/0611* (2013.01); *G06F 3/0631* (2013.01); *G06F 3/0635* (2013.01); *G06F 3/0644* (2013.01);
(Continued)

(58) Field of Classification Search
CPC .................................................... G06F 9/4881
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Charlie Sun
(74) *Attorney, Agent, or Firm* — James Nock; Andrew D. Wright; Roberts Calderon Safran & Cole, P.C.

(57) ABSTRACT

A method includes receiving, by a process balancing module, a suspension request from a DS processing module of the DSN where the suspension request is for temporarily suspending processing of DSN access requests. The method further includes determining, by the process balancing module, whether sufficient processing resources of active DS processing units of the plurality of DS processing units are available for processing DSN access requests on behalf of the DS processing unit. When determined that sufficient processing resources are available, the method further includes granting the suspension request, and allocating DSN access requests of the DS processing unit to one or more of the active DS processing units.

18 Claims, 6 Drawing Sheets

Related U.S. Application Data

(60) Provisional application No. 62/314,792, filed on Mar. 29, 2016.

(51) Int. Cl.

| | |
|---|---|
| ***G06F 11/10*** | (2006.01) |
| ***G06F 8/65*** | (2018.01) |
| ***H04L 29/08*** | (2006.01) |
| ***H03M 13/05*** | (2006.01) |
| ***G06F 21/31*** | (2013.01) |
| ***H04L 29/06*** | (2006.01) |
| ***H04L 29/12*** | (2006.01) |
| *H03M 13/37* | (2006.01) |
| *H03M 13/15* | (2006.01) |
| *H03M 13/00* | (2006.01) |

(52) U.S. Cl.

CPC .......... *G06F 3/0647* (2013.01); *G06F 3/0659* (2013.01); *G06F 8/65* (2013.01); *G06F 9/485* (2013.01); *G06F 9/4881* (2013.01); *G06F 11/1076* (2013.01); *G06F 11/1092* (2013.01); *G06F 21/31* (2013.01); *H03M 13/05* (2013.01); *H04L 61/10* (2013.01); *H04L 61/20* (2013.01); *H04L 63/08* (2013.01); *H04L 63/104* (2013.01); *H04L 63/108* (2013.01); *H04L 67/1097* (2013.01); *H04L 67/28* (2013.01); *G06F 2221/2133* (2013.01); *H03M 13/1515* (2013.01); *H03M 13/373* (2013.01); *H03M 13/616* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

distributed, or dispersed, storage network (DSN) 10

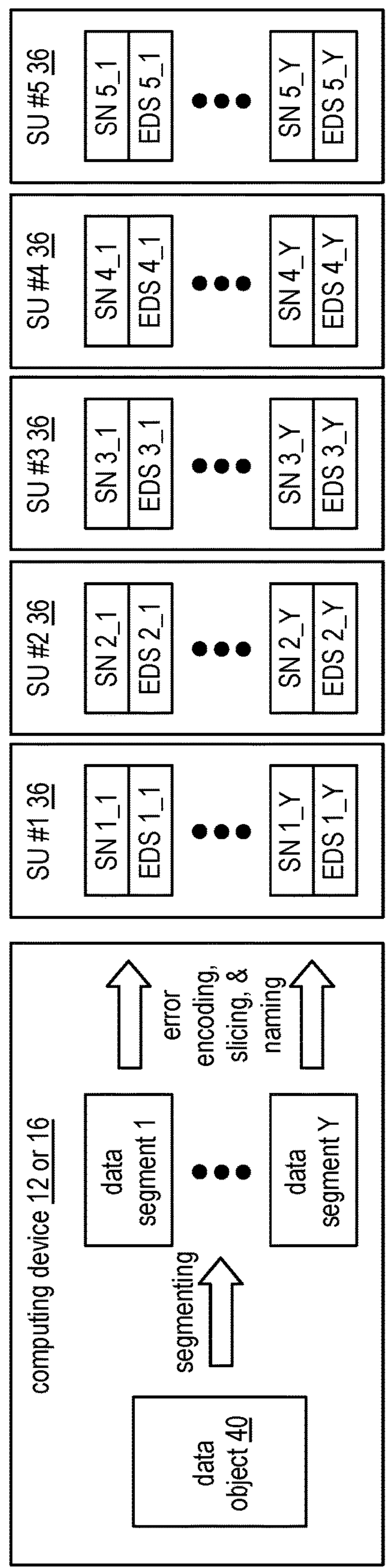
FIG. 3
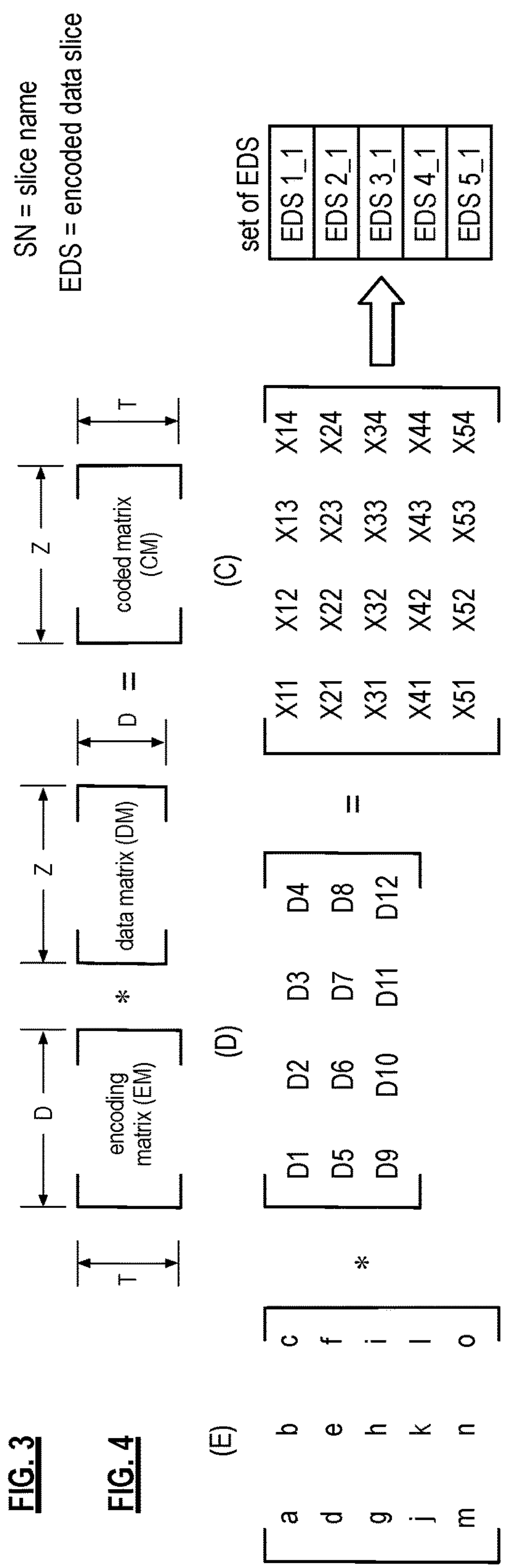
FIG. 4
FIG. 5
slice name 80
| pillar # | data segment # | vault ID | data object ID | rev. info |
|---|---|---|---|---|
FIG. 6

CYCLING OUT DISPERSED STORAGE PROCESSING UNITS FROM ACCESS POOLS TO PERFORM EXPENSIVE OPERATIONS

CROSS REFERENCE TO RELATED PATENTS

The present U.S. Utility Patent Application claims priority pursuant to 35 U.S.C. § 120 as a continuation of U.S. application Ser. No. 15/467,121, entitled "CYCLING OUT DISPERSED STORAGE PROCESSING UNITS FROM ACCESS POOLS TO PERFORM EXPENSIVE OPERATIONS," filed Mar. 23, 2017, which claims priority pursuant to 35 U.S.C. § 119(e) to U.S. Provisional Application No. 62/314,792, entitled "SELECTING A PROCESSING UNIT IN A DISPERSED STORAGE NETWORK," filed Mar. 29, 2016, both of which are incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. As is further known, a dispersed storage system may require load balancing to properly and efficiently execute data access requests.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
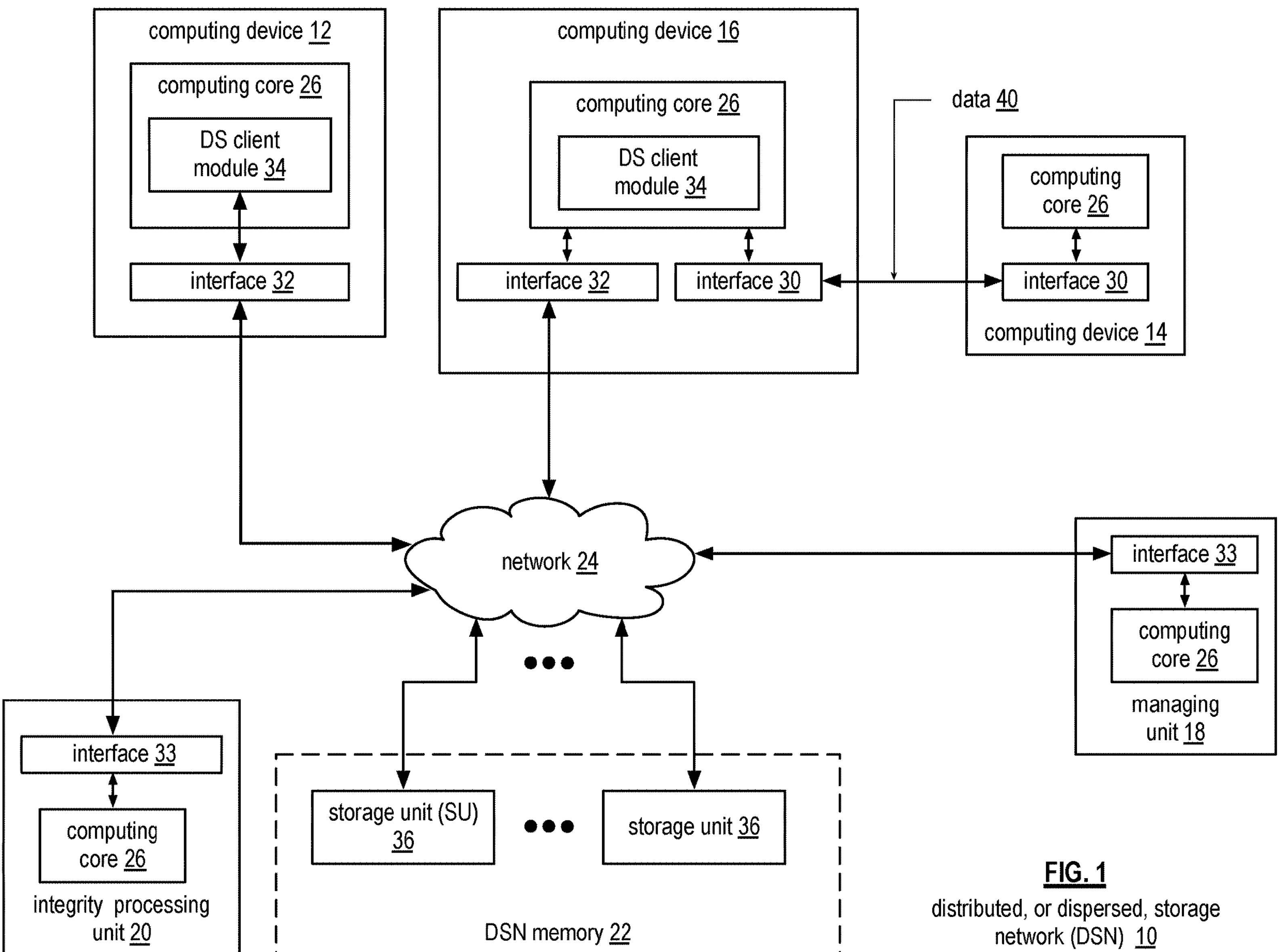
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
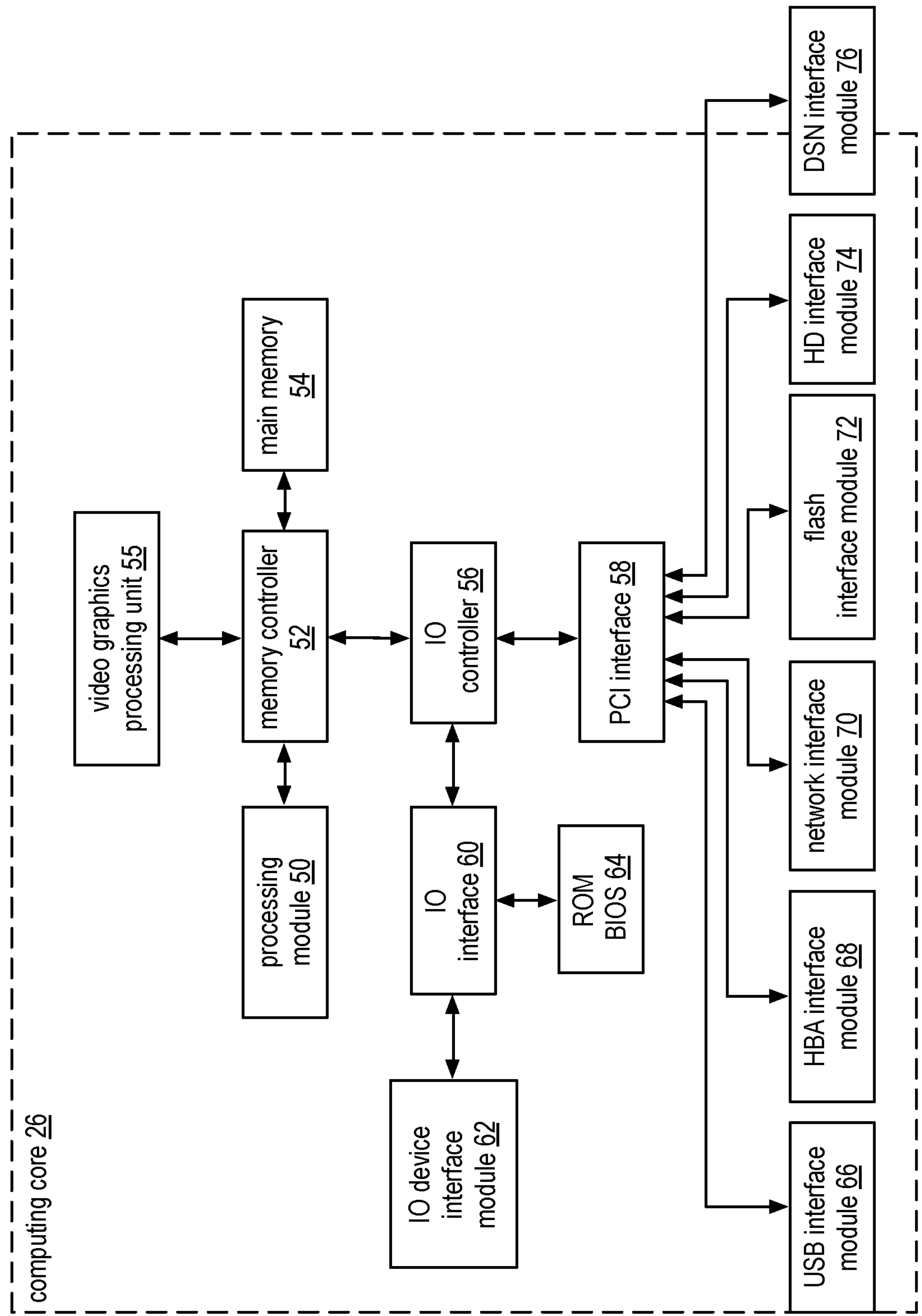
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
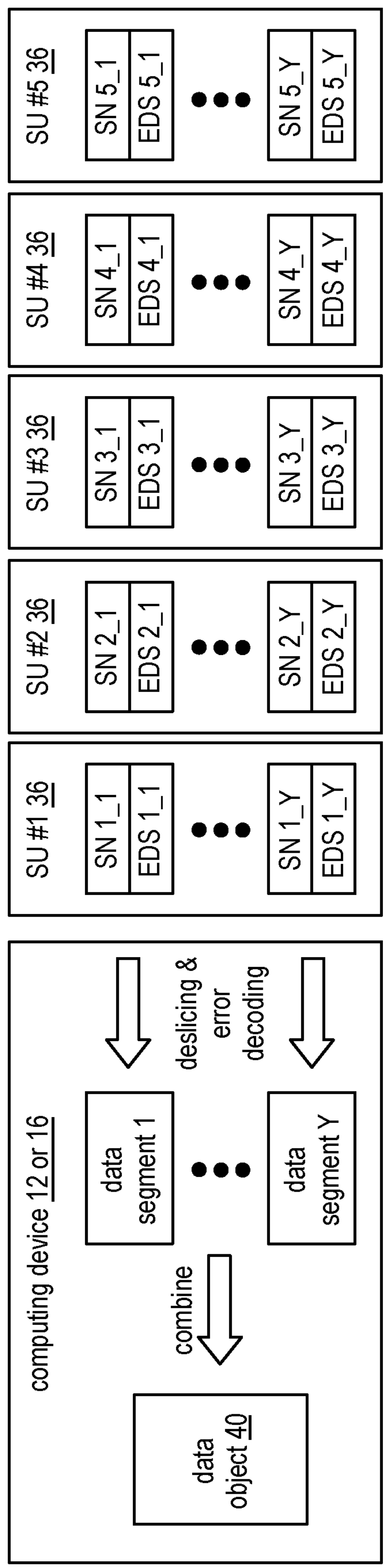
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
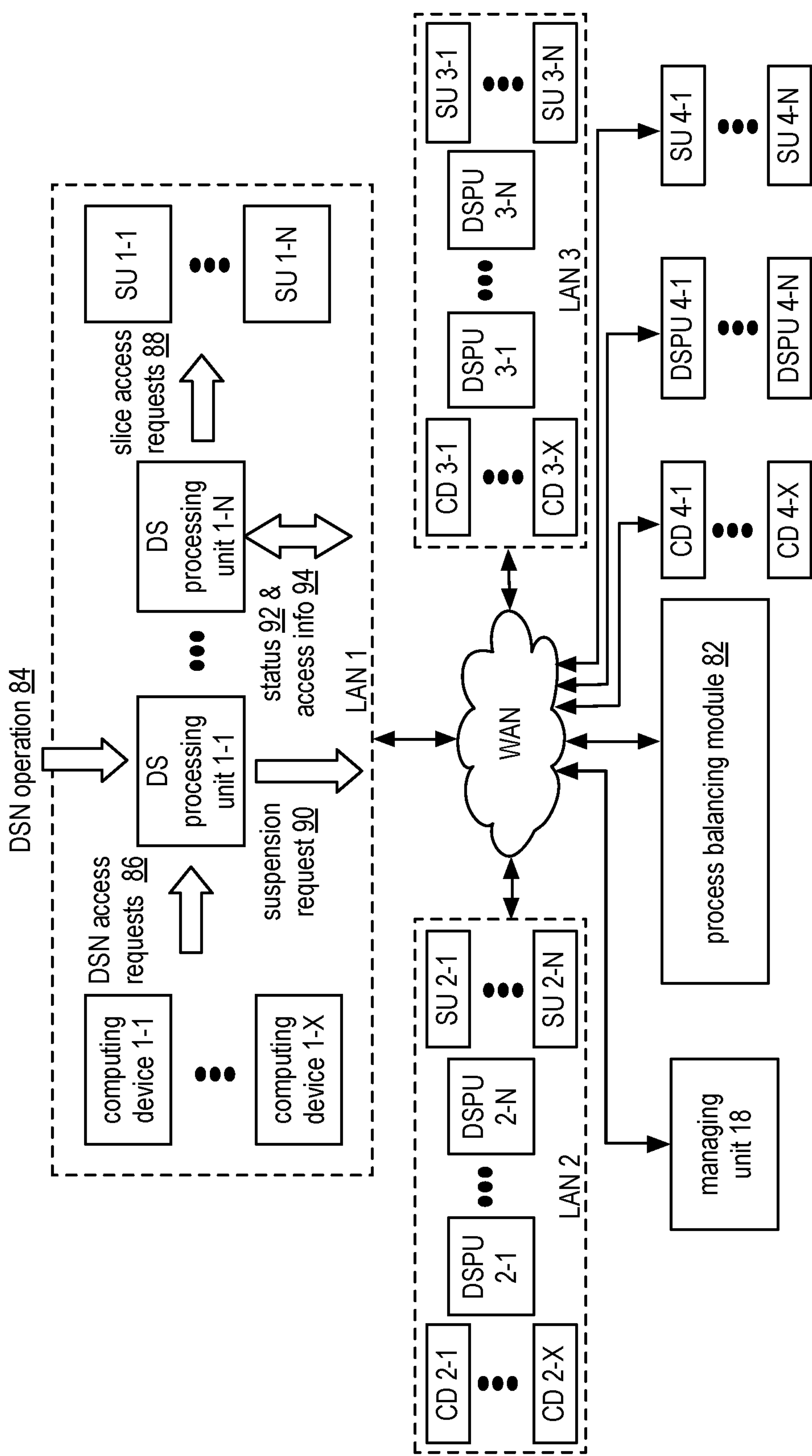
FIG. 9 is a schematic block diagram of another embodiment of a dispersed storage network (DSN) in accordance with the present invention.

FIG. 9 is a schematic block diagram of another embodiment of a dispersed storage network (DSN). The DSN includes a plurality of local area networks (LANs), DS processing units 4-1 through 4-N, computing devices 4-1 through 4-X, managing unit 18, and storage units 4-1 through 4_N connected via a wide area network (WAN). The network is shown in FIG. 9 as WAN but may include one or more wireless and/or wire lined communication systems; and/or one or more non-public intranet systems and/or public internet systems. Each LAN includes a set of DS processing units, a set of computing devices, and a set of storage units. LAN 1 includes computing devices 1-1 through 1-X, DS processing units 1-1 through 1-N, and storage units 1-1 through 1_N. LAN 2 includes computing devices 2-1 through 2-X, DS processing units 2-1 through 2-N, and storage units 2-1 through 2_N. LAN 3 includes computing devices 3-1 through 3-X, DS processing units 3-1 through 3-N, and storage units 3-1 through 3_N.

In an example of operation, DS processing units 1-1 through 1-N of LAN 1 receive DSN access requests 86 from computing devices 1-1 through 1-X of LAN 1. The DSN access requests 86 include two or more of a read request, a write request, a rebuild request, a list request, a delete request, and a modify request. DS processing units 1-1 through 1-N also receive DSN operations from managing unit 18 via the WAN. DSN operations include one or more of garbage collection, software update, a system administration operation, and a diagnostic operation. Some DSN operations pause a DS processing unit's ability to process DSN access requests for a significant time period (e.g., are "expensive"). Such pauses may undermine service level agreements (SLAs) or performance targets that aim for worst case access times at some average or percentile for a DSN access request. For example, a SLA might stipulate that the worst-case performance at the 99th percentile for data object access is to not exceed 50 milliseconds.

To prevent undermining an SLA, DS processing units can coordinate DSN operations (such as garbage collections or other processes that cause the DS processing unit to become unresponsive) with the times the DS processing unit will not receive DSN access requests by communicating with the process balancing module 82. When able, the process balance module 82 distributes DSN access request processing to other active DS processing units of the plurality of DS processing units when a DS processing unit is executing a DSN operation that may otherwise interfere with the processing of DSN access requests. For example, DS processing unit 1-1 receives a DSN operation 84 from managing unit 18 via the WAN. DS processing unit 1-1 identifies DSN operation 84 as a process that will adversely interfere with processing DSN access requests 86 (e.g., any process that will adversely affect service level agreement or performance targets) received by computing devices 1-1 through 1-X. To prevent the adverse effect, DS processing unit 1-1 sends a suspension request 90 to the process balancing module 82 via the WAN to temporarily suspend processing the DSN access requests 86.

The process balancing module 82 then determines whether sufficient processing resources of active DS processing units of the plurality of DS processing units are available for processing DSN access requests on behalf of DS processing unit 1-1. Determining whether sufficient processing resources of active DS processing units are available requires the process balancing module 82 to determine a duration for which DS processing unit 1-1 will be unavailable for processing the DSN access requests 86. The process balancing module 82 also estimates processing requirements for processing the DSN access requests 86 of DS processing unit 1-1. The process balancing module 82 also determines a number of other DS processing units of the plurality of DS processing units that are currently in a temporary suspension mode (e.g., status 92). The process balancing module 82 also estimates processing requirements for processing other DSN access requests by the active DS processing units during the duration for which DS processing unit 1-1 will be unavailable (e.g., access information 90). Further, the process balancing module 82 determines the processing capabilities of the active DS processing units (e.g., access information 90).

When the process balancing module 82 determines that sufficient processing resources are available, the process balancing module 82 grants the suspension request 90 and allocates the DSN access requests 86 of DS processing unit 1-1 to one or more of the active DS processing units. For example, the process balancing module 82 determines that, based on the status 92 and access info 90 received from another DS processing unit in LAN 1 (DS processing unit 1-N), the DSN access requests 86 may be allocated to DS processing unit 1-N. As described in this example, the process balancing module 82 allocates the DSN access requests 86 to one active DS processing unit when the active DS processing unit (e.g., DS processing unit 1-N) is part of a common local area network with the DS processing unit (e.g., LAN 1). When the active DS processing units are not located in the same local area network, or no active DS processing units are present in the local area network, other allocation methods may be implemented.

For example, the process balancing module 82 may allocate the DSN access requests 86 of DS processing unit 1-1 to active DS processing units in accordance with a load balancing function (e.g., in a round robin manner, weighted function based on individual processing capabilities, etc.). As another example, the process balancing module 82 may allocate the DSN access requests 86 of DS processing unit 1-1 according to the type of DSN access request. For example, the process balancing module 82 may allocate read requests to a first active DS processing unit of the one or more active DS processing units, write requests to a second active DS processing unit of the one or more active DS processing units, list requests to a third active DS processing unit of the one or more active DS processing units, and rebuild support requests to a fourth active DS processing unit of the one or more active DS processing units.

When the DSN access requests 86 include a write request, the process balancing module 82 may allocate a unity matrix multiplication to a first active DS processing unit of the one or more active DS processing units, where the first active DS processing unit generates a first subset of encoded data slices of a set of encoded data slices by matrix multiplying a unity matrix of an encoding matrix with a data matrix, where a data segment of a data object is divided into data blocks that are arranged into the data matrix. A first redundancy matrix multiplication is allocated by the process balancing module 82 to a second active DS processing unit of the one or more active DS processing units, where the second active DS processing unit generates a first redundancy encoded data slice of the set of encoded data slices by matrix multiplying a first redundancy row of the encoding matrix with the data matrix. A second redundancy matrix multiplication is then allocated by the process balancing module 82 to a third active DS processing unit of the one or more active DS processing units, where the third active DS processing unit generates a second redundancy encoded data slice of the set of encoded data slices by matrix multiplying a second redundancy row of the encoding matrix with the data matrix.

When the DSN access requests are allocated, DS processing unit 1-1 executes the DSN operation. Upon completion, DS processing unit 1-1 sends a return notification to the process balancing module 82 to return to the access pool. In response to the return notification, the process balancing module 82 returns allocation of the DSN access requests 86 to DS processing unit 1-1.

If the process balancing module 82 determines that sufficient processing resources are not available, the process balancing module 82 temporarily denies the suspension request 90 until sufficient processing resources become available. For example, the process balancing module 82 may wait for other DS processing units to come out of suspension or for load requirements to decrease.

Figure 10:
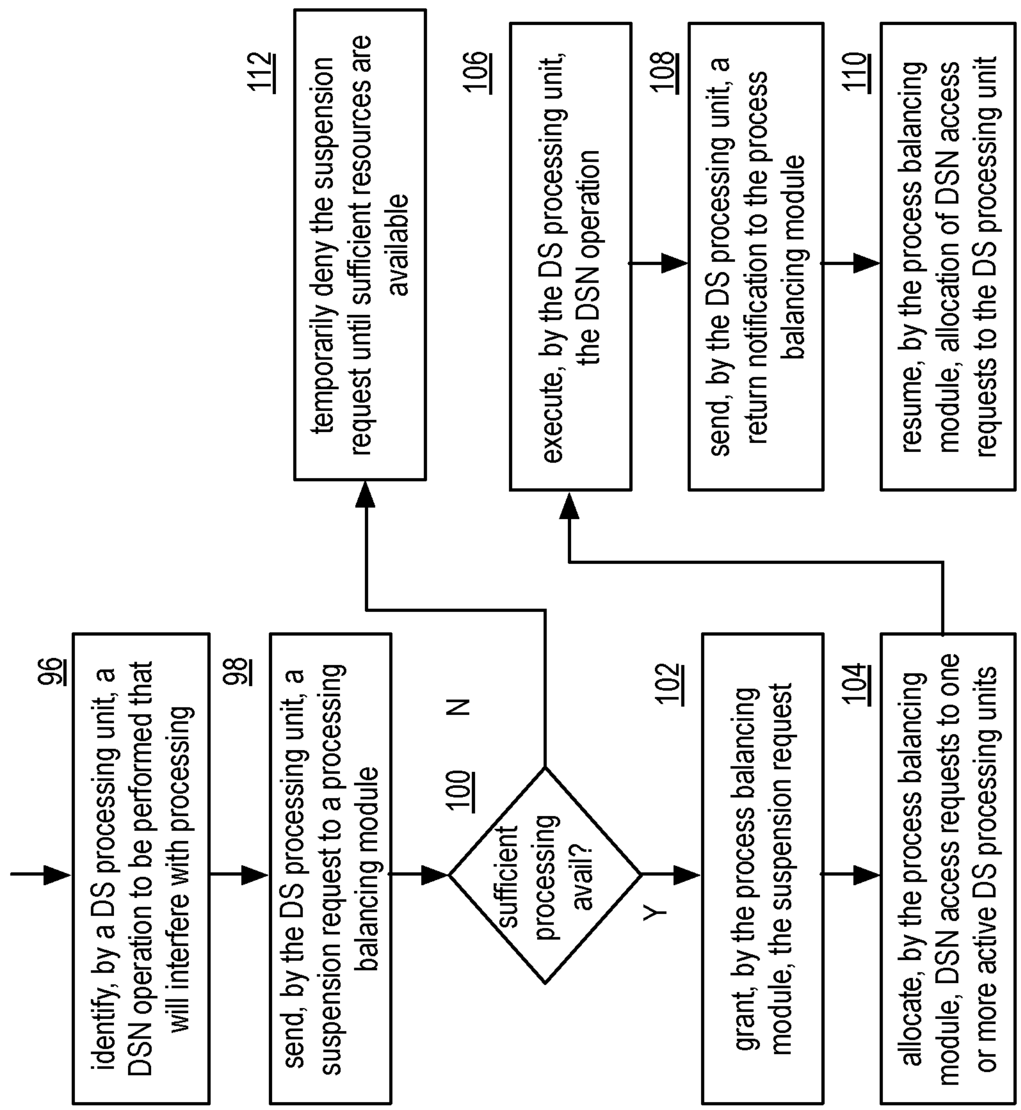
FIG. 10 is a logic diagram of an example of a method of dispersed storage network (DSN) process balancing in accordance with the present invention.

FIG. 10 is a logic diagram of an example of a method of dispersed storage (DS) processing unit process balancing. The method begins with step 96 where a DS processing unit of a plurality of DS processing units of the DSN receives a DSN operation to be performed that will adversely interfere with processing of DSN access requests. DSN access requests include two or more of a read request, a write request, a rebuild request, a list request, a delete request, and a modify request. DSN operations include one or more of garbage collection, software update, a system administration operation, and a diagnostic operation. DSN operations may pause a DS processing unit's ability to process DSN access requests for a significant period of time. Such a pause may undermine service level agreements (SLAs) or performance targets that aim for worst case access times at some average or percentile for a DSN access request. For example, a SLA might stipulate that the worst-case performance at the 99th percentile for data object access to not exceed 50 milliseconds.

To prevent the adverse effect, the method continues with step 98 where the DS processing unit sends a suspension request to the process balancing module to temporarily suspend the processing of the DSN access requests. The method continues with step 100 where the process balancing module determines whether sufficient processing resources of active DS processing units of the plurality of DS processing units are available for processing DSN access requests on behalf of the DS processing unit. Determining whether sufficient processing resources of active DS processing units are available requires the process balancing module to determine a duration for which DS processing unit will be unavailable for processing the DSN access requests. The process balancing module also estimates processing requirements for processing the DSN access requests of the DS processing unit. The process balancing module also determines a number of other DS processing units of the plurality of DS processing units that are currently in a temporary suspension mode. The process balancing module also estimates processing requirements for processing other DSN access requests by the active DS processing units during the duration for which the DS processing unit will be unavailable. Further, the process balancing module determines the processing capabilities of the active DS processing units.

When the process balancing module determines that sufficient processing resources are available, the method continues with step 102 where the process balancing module grants the suspension request. The method continues to step 104 where the process balancing module allocates the DSN access requests of the DS processing unit to one or more of the active DS processing units. For example, the process balancing module may allocate the DSN access requests of the DS processing unit to one of the active DS processing units when the one of the active DS processing units is part of a common local area network with the DS processing unit. Alternatively, the process balancing module may allocate the DSN access requests of the DS processing unit to active DS processing units in accordance with a load balancing function (e.g., in a round robin manner, weighted function based on individual processing capabilities, etc.). As another example, the process balancing module may allocate the DSN access requests of the DS processing unit according to the type of DSN access request. For example, the process balancing module may allocate read requests to a first active DS processing unit of the one or more active DS processing units, write requests to a second active DS processing unit of the one or more active DS processing units, list requests to a third active DS processing unit of the one or more active DS processing units, and rebuild support requests to a fourth active DS processing unit of the one or more active DS processing units.

When the DSN access requests include a write request, the process balancing module may allocate a unity matrix multiplication to a first active DS processing unit of the one or more active DS processing units, where the first active DS processing unit generates a first subset of encoded data slices of a set of encoded data slices by matrix multiplying a unity matrix of an encoding matrix with a data matrix, where a data segment of a data object is divided into data blocks that are arranged into the data matrix. A first redundancy matrix multiplication is allocated by the process balancing module to a second active DS processing unit of the one or more active DS processing units, where the second active DS processing unit generates a first redundancy encoded data slice of the set of encoded data slices by matrix multiplying a first redundancy row of the encoding matrix with the data matrix. A second redundancy matrix multiplication is then allocated by the process balancing module to a third active DS processing unit of the one or more active DS processing units, where the third active DS processing unit generates a second redundancy encoded data slice of the set of encoded data slices by matrix multiplying a second redundancy row of the encoding matrix with the data matrix.

When the DSN access requests are allocated, the method continues with step 106 where the DS processing unit executes the DSN operation. The method continues with step 108 where the DS processing unit sends a return notification to the process balancing module. The method continues with step 110 where, in response to the return notification, the process balancing module returns allocation of the DSN access requests to the DS processing unit.

When, at step 100, the process balancing module determines that sufficient processing resources are not available, the method continues with step 110 where the process balancing module temporarily denies the suspension request until sufficient processing resources become available. For example, the process balancing module may wait for other DS processing units to come out of suspension, or for load requirements to decrease.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

receiving, by a process balance module of a dispersed storage network (DSN), a suspension request from a dispersed storage (DS) processing unit of a plurality of DS processing units of the DSN, wherein the DS processing unit has determined that it has a DSN operation to perform that will adversely interfere with processing of DSN access requests;

determining, by the process balancing module, whether sufficient processing resources of active DS processing units of the plurality of DS processing units are available for processing DSN access requests on behalf of the DS processing unit; and when determined that sufficient processing resources are available:

granting, by the process balancing module, the suspension request; and allocating, by the process balancing module, DSN access requests of the DS processing unit to one or more of the active DS processing units.

2. The method of claim 1 further comprises:

receiving, by the process balancing module, a return notification from the DS processing unit indicating that the DS processing unit has executed the DSN operation; and in response to the return notification, resuming, by the process balancing module, allocation of the DSN access requests of the DS processing unit to the DS processing unit.

3. The method of claim 1 further comprises:

the DSN operation including one or more of garbage collection, software update, a system administration operation, and a diagnostic operation; and the DSN access requests including two or more of a read request, a write request, a rebuild request, a list request, a delete request, and a modify request.

4. The method of claim 1 further comprises:

when determined that sufficient processing resources are not available, temporarily denying, by the process balancing module, the suspension request until sufficient processing resources become available.

5. The method of claim 1, wherein the determining that sufficient processing resources are available comprises:

determining, by the process balancing module, a duration for which the DS processing unit will be unavailable for processing the DSN access requests of the DS processing unit;

estimating, by the process balancing module, processing requirements for processing the DSN access requests of the DS processing unit;

determining, by the process balancing module, a number of other DS processing units of the plurality of DS processing units that are currently in a temporary suspension mode;

estimating, by the process balancing module, processing requirements for processing other DSN access requests by the active DS processing units during the duration; and determining, by the process balancing module, processing capabilities of the active DS processing units.

6. The method of claim 1, wherein the allocating the DSN access requests of the DS processing unit further comprises:

allocating, by the process balancing module, the DSN access requests of the DS processing unit to the active DS processing units in accordance with a load balancing function.

7. The method of claim 1, wherein the allocating the DSN access requests of the DS processing unit further comprises:

allocating, by the process balancing module, read requests to a first active DS processing unit of the one or more active DS processing units;

allocating, by the process balancing module, write requests to a second active DS processing unit of the one or more active DS processing units;

allocating, by the process balancing module, list requests to a third active DS processing unit of the one or more active DS processing units; and allocating, by the process balancing module, rebuild support requests to a fourth active DS processing unit of the one or more active DS processing units.

8. The method of claim 1, wherein the allocating the DSN access requests of the DS processing unit further comprises:

for a write request of the DSN access requests:

allocating, by the process balancing module, a unity matrix multiplication to a first active DS processing unit of the one or more active DS processing units, wherein the first active DS processing unit generates a first subset of encoded data slices of a set of encoded data slices by matrix multiplying a unity matrix of an encoding matrix with a data matrix, wherein a data segment of a data object is divided into data blocks that are arranged into the data matrix;

allocating, by the process balancing module, first redundancy matrix multiplication to a second active DS processing unit of the one or more active DS processing units, wherein the second active DS processing unit generates a first redundancy encoded data slice of the set of encoded data slices by matrix multiplying a first redundancy row of the encoding matrix with the data matrix; and allocating, by the process balancing module, second redundancy matrix multiplication to a third active DS processing unit of the one or more active DS processing units, wherein the third active DS processing unit generates a second redundancy encoded data slice of the set of encoded data slices by matrix multiplying a second redundancy row of the encoding matrix with the data matrix.

9. The method of claim 1, wherein the allocating the DSN access requests of the DS processing unit further comprises:

allocating, by the process balancing module, the DSN access requests of the DS processing unit to one of the active DS processing units when the one of the active DS processing units is part of a common local area network with the DS processing unit.

10. A computing device of a dispersed storage network (DSN) comprises:

memory to store operational instructions for implementing a process balancing module;

an interface; and a processing module operably coupled to the memory and the interface, wherein, when the processing module executes the operational instructions, the operational instructions cause the processing module to:

receive, via the interface, a suspension request from a dispersed storage (DS) processing unit of a plurality of DS processing units of the DSN, wherein the DS processing unit has determined that it has a DSN operation to perform that will adversely interfere with processing of DSN access requests;

determine whether sufficient processing resources of active DS processing units of the plurality of DS processing units are available for processing DSN access requests on behalf of the DS processing unit; and when determined that sufficient processing resources are available:

grant the suspension request; and allocate DSN access requests of the DS processing unit to one of more of the active DS processing units.

11. The computing device of claim 10, wherein the processing module is further operable to:

receive, via the interface, a return notification from the DS processing unit indicating that the DS processing unit has executed the DSN operation; and in response to the return notification, resume allocation of the DSN access requests of the DS processing unit to the DS processing unit.

12. The computing device of claim 10, wherein the processing module is further operable to:

the DSN operation including one or more of garbage collection, software update, a system administration operation, and a diagnostic operation; and the DSN access requests including two or more of a read request, a write request, a rebuild request, a list request, a delete request, and a modify request.

13. The computing device of claim 10, wherein the processing module is further operable to:

when determined that sufficient processing resources are not available, temporarily deny the suspension request until sufficient processing resources become available.

14. The computing device of claim 10, wherein the processing module is further operable to determine that sufficient processing resources are available by:

determining a duration for which the DS processing unit will be unavailable for processing the DSN access requests of the DS processing unit;

estimating processing requirements for processing the DSN access requests of the DS processing unit;

determining a number of other DS processing units of the plurality of DS processing units that are currently in a temporary suspension mode;

estimating processing requirements for processing other DSN access requests by the active DS processing units during the duration; and determining processing capabilities of the active DS processing units.

15. The computing device of claim 10, wherein the processing module is further operable to allocate the DSN access requests of the DS processing unit further by:

allocating the DSN access requests of the DS processing unit to the active DS processing units in accordance with a load balancing function.

16. The computing device of claim 10, wherein the processing module is further operable to allocate the DSN access requests of the DS processing unit further by:

allocating read requests to a first active DS processing unit of the one or more active DS processing units;

allocating write requests to a second active DS processing unit of the one or more active DS processing units;

allocating list requests to a third active DS processing unit of the one or more active DS processing units; and allocating rebuild support requests to a fourth active DS processing unit of the one or more active DS processing units.

17. The computing device of claim 10, wherein the process module is further operable to allocate the DSN access requests of the DS processing unit further by:

for a write request of the DSN access requests:

allocating a unity matrix multiplication to a first active DS processing unit of the one or more active DS processing units, wherein the first active DS processing unit generates a first subset of encoded data slices of a set of encoded data slices by matrix multiplying a unity matrix of an encoding matrix with a data matrix, wherein a data segment of a data object is divided into data blocks that are arranged into the data matrix;

allocating first redundancy matrix multiplication to a second active DS processing unit of the one or more active DS processing units, wherein the second active DS processing unit generates a first redundancy encoded data slice of the set of encoded data slices by matrix multiplying a first redundancy row of the encoding matrix with the data matrix; and allocating second redundancy matrix multiplication to a third active DS processing unit of the one or more active DS processing units, wherein the third active DS processing unit generates a second redundancy encoded data slice of the set of encoded data slices by matrix multiplying a second redundancy row of the encoding matrix with the data matrix.

18. The computing device of claim 10, wherein the processing module is further operable to allocate the DSN access requests of the DS processing unit further by:

allocating the DSN access requests of the DS processing unit to one of the active DS processing units when the one of the active DS processing units is part of a common local area network with the DS processing unit.

* * * * *